(12) United States Patent
Salmons

(10) Patent No.: US 10,598,385 B2
(45) Date of Patent: Mar. 24, 2020

(54) SOLID FUEL STOVE

(71) Applicant: Kirk Salmons, Front Royal, VA (US)

(72) Inventor: Kirk Salmons, Front Royal, VA (US)

( * ) Notice: Subject to any disclaimer, the term of this patent is extended or adjusted under 35 U.S.C. 154(b) by 236 days.

(21) Appl. No.: 15/436,746

(22) Filed: Feb. 17, 2017

(65) Prior Publication Data
US 2018/0195733 A1 Jul. 12, 2018

(51) Int. Cl.
F24B 1/20 (2006.01)
F24B 13/04 (2006.01)
F23B 50/12 (2006.01)

(52) U.S. Cl.
CPC .............. F24B 1/207 (2013.01); F23B 50/12 (2013.01); F24B 13/04 (2013.01); Y02A 40/928 (2018.01); Y02B 40/163 (2013.01)

(58) Field of Classification Search
None
See application file for complete search history.

(56) References Cited

U.S. PATENT DOCUMENTS

| 148,970 | A | * | 3/1874 | Moore | A47J 37/0763 |
| | | | | | 126/9 R |
| 820,528 | A | * | 5/1906 | Southam | F23K 3/16 |
| | | | | | 414/176 |
| 1,061,959 | A | | 5/1912 | Jones | |
| 1,236,990 | A | | 7/1916 | Shearer | |
| 1,384,772 | A | | 7/1921 | Mitiska | |
| 1,504,305 | A | | 8/1924 | Alig | |
| 2,038,226 | A | * | 4/1936 | Lang | F24B 1/202 |
| | | | | | 126/25 R |
| 2,076,783 | A | * | 4/1937 | Jones | F24B 1/205 |
| | | | | | 126/9 R |
| 2,104,617 | A | | 4/1937 | Gilbert | |
| 2,204,555 | A | * | 6/1940 | Valentine | F23H 7/00 |
| | | | | | 110/109 |
| 3,765,397 | A | * | 10/1973 | Henderson | A47J 37/0763 |
| | | | | | 126/25 R |
| 3,915,144 | A | * | 10/1975 | Tomita | A47J 37/0763 |
| | | | | | 126/25 B |
| 4,117,824 | A | | 10/1978 | McIntire et al. | |
| 4,117,826 | A | | 10/1978 | Bette | |
| 4,328,786 | A | * | 5/1982 | Owen | F23J 1/06 |
| | | | | | 110/281 |
| 4,489,706 | A | * | 12/1984 | Hait | F24C 1/16 |
| | | | | | 126/1 D |
| 4,558,687 | A | | 12/1985 | Minshall et al. | |
| 4,665,840 | A | * | 5/1987 | Yarnell | F23K 3/16 |
| | | | | | 110/109 |
| 5,119,799 | A | | 6/1992 | Cowan | |
| 5,144,939 | A | * | 9/1992 | Christopherson | A01G 13/06 |
| | | | | | 110/108 |
| 5,357,877 | A | * | 10/1994 | Nuesmeyer | F23B 50/12 |
| | | | | | 110/108 |
| 8,020,547 | B2 | | 9/2011 | Hepper et al. | |
| 8,166,870 | B2 | * | 5/2012 | Badin | A47J 37/0713 |
| | | | | | 126/25 R |

(Continued)

Primary Examiner — Avinash A Savani
Assistant Examiner — Martha M Becton
(74) Attorney, Agent, or Firm — Da Vinci's Notebook, LLC

(57) ABSTRACT

The present invention includes a stove with an efficiently-burning fuel bay and chimney that permits ascending combusted gases to cook food on a cooking shelf. The fuel bay may include a grate that is angled commensurate with a fuel-addition chute.

4 Claims, 5 Drawing Sheets

(56) References Cited

U.S. PATENT DOCUMENTS

| | | | |
|---|---|---|---|
| 10,165,888 B2* | 1/2019 | Steputis | A47J 27/002 |
| 2005/0045169 A1* | 3/2005 | Bads | A47J 37/0763 |
| | | | 126/25 R |
| 2006/0225723 A1 | 10/2006 | Yu | |
| 2012/0064215 A1* | 3/2012 | Michaud | A47J 37/0704 |
| | | | 426/523 |
| 2015/0201805 A1* | 7/2015 | Cedar | A47J 37/0754 |
| | | | 126/25 R |
| 2017/0079460 A1* | 3/2017 | Steputis | A47J 27/002 |

* cited by examiner

SOLID FUEL STOVE

FIELD OF THE INVENTION

The present invention relates to the field heating devices and more specifically to the field of solid-fuel-based cooking appliances.

BACKGROUND

Heating and cooking with solid fuels was the standard since the advent of fire itself. Solid fuel stoves remain a popular and efficient heating appliance. There is no reliance on an outside party, e.g. gas company or electric company, for the use of the appliance; and the fuel can be acquired at minimal or no cost. Therefore there is a need for a solid-fuel stove that provides efficient heat and that is simply cleaned and assembled.

SUMMARY

The present invention was developed as a new way to provide a cooking tool that could be used on a variety of readily available fuels with no need for gases or electricity yet be made robust enough to be able to be stored outside and withstand the elements. Simple camping stoves or small portable grills, usually propane, found in almost all outdoor-type catalogs, big-box store outdoor sections), are most commonly used in outdoor cooking. The use of flammable gasses permits light construction, and easily lends the devices that implement gases to mass production with lower quality components which far less robust. They also have burners, igniters, grates, that will deteriorate over time and need to be replaced, especially if the unit is not properly maintained. They are made to be incredibly lightweight and collapsible for packing/traveling. The commercial embodiment of the present invention weighs around 35 kg and runs on any scrap wood or sticks that may be lying around, runs at a high efficiency and with enough heat to boil water, sear steaks, or cook large quantities of food over several hours, day after day, month after month.

The present invention has a unique funnel at the top terminating in a cooking surface. This funnel shape allows any grease drippings a path while not causing flame-ups and spreads the heat for use with a large skillet or pot. The commercial embodiment of the present invention is a solid steel unit designed for outdoor use in cooking, prepping food, or providing a place to have a controlled fire for entertaining. It is designed to be wood fed but can also run on charcoal or any fuel source that will burn in the chamber to provide the desired results. Fuel is fed into an angled chute which gravity feeds into the fuel bay. This setup makes the stove easy to use as gravity and air flow take care of keeping the fire going. The fuel bay is designed to allow air flow to come in from the lowest part of the fuel bay with an upward draft for high efficiency and clean burning. The burn chamber goes up a chimney out to the cooking surface, which is made of stainless steel and is hinged for easy opening. At the base of the fuel bay is a stainless steel ash grate which holds coals until they're small enough to fall through to the bottom of the tube. Then an ash door incorporated into the bottom of the tube can slide out allowing the ash to just drop out so there is no need for a shovel or other method to clear out ash; again, gravity does the work.

Wrapping around the stove is a solid steel peripheral plate called the "potato plate." This is a warming shelf, with handles cut into it for carrying the stove, that allows the user to keep food warm after cooking or to actually slow cook food if that method works well for the particular dish. This plate provides a steady, radiant heat. The legs of the stove are adjustable to allow it to be leveled on uneven terrain. The use of steel in the stove provides the durability and longevity plus withstands the heat that the stove puts out.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

DETAILED DESCRIPTION OF PREFERRED EMBODIMENTS

Figure 1:
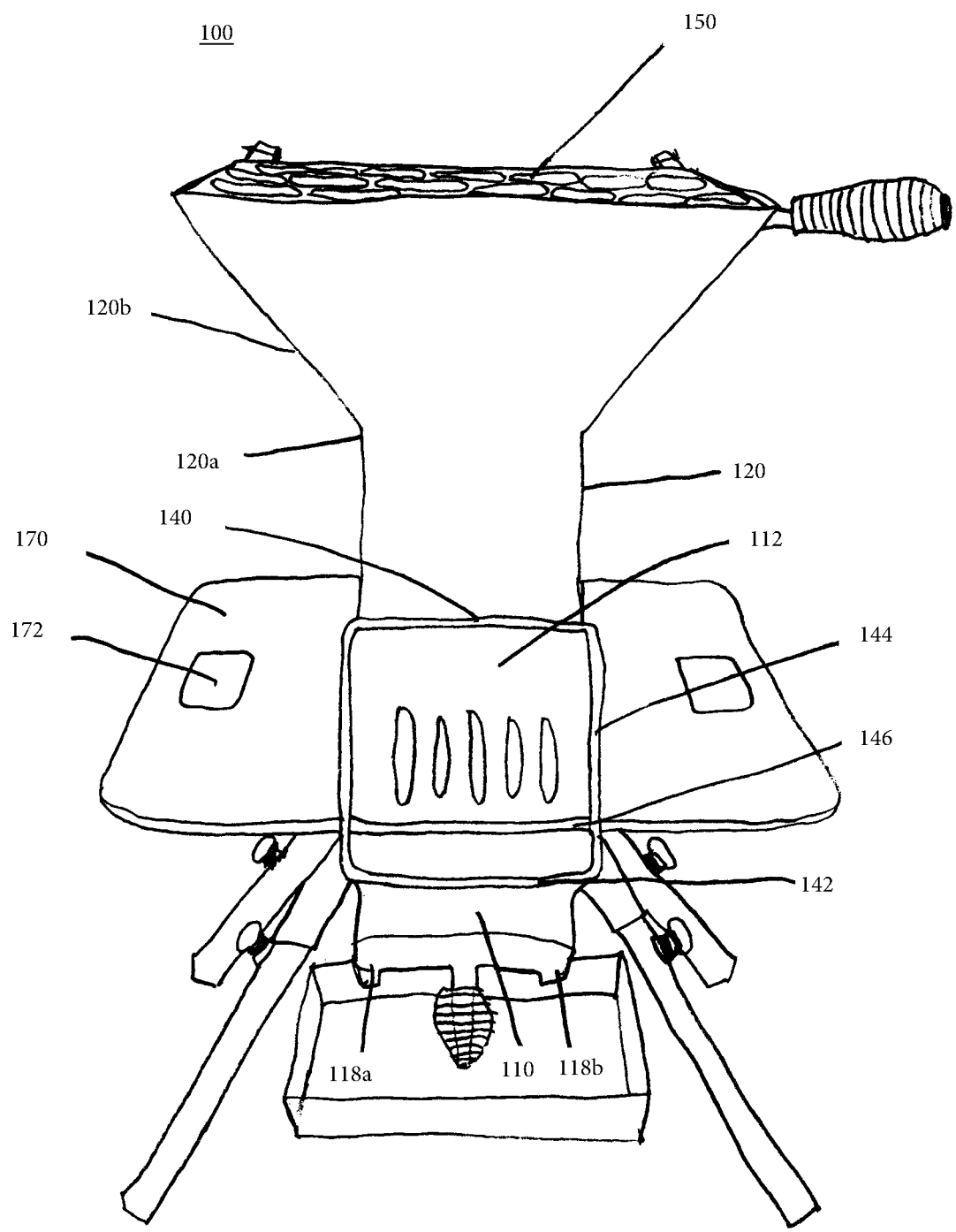
FIG. 1 is a perspective, front view of the present invention.
Figure 2:
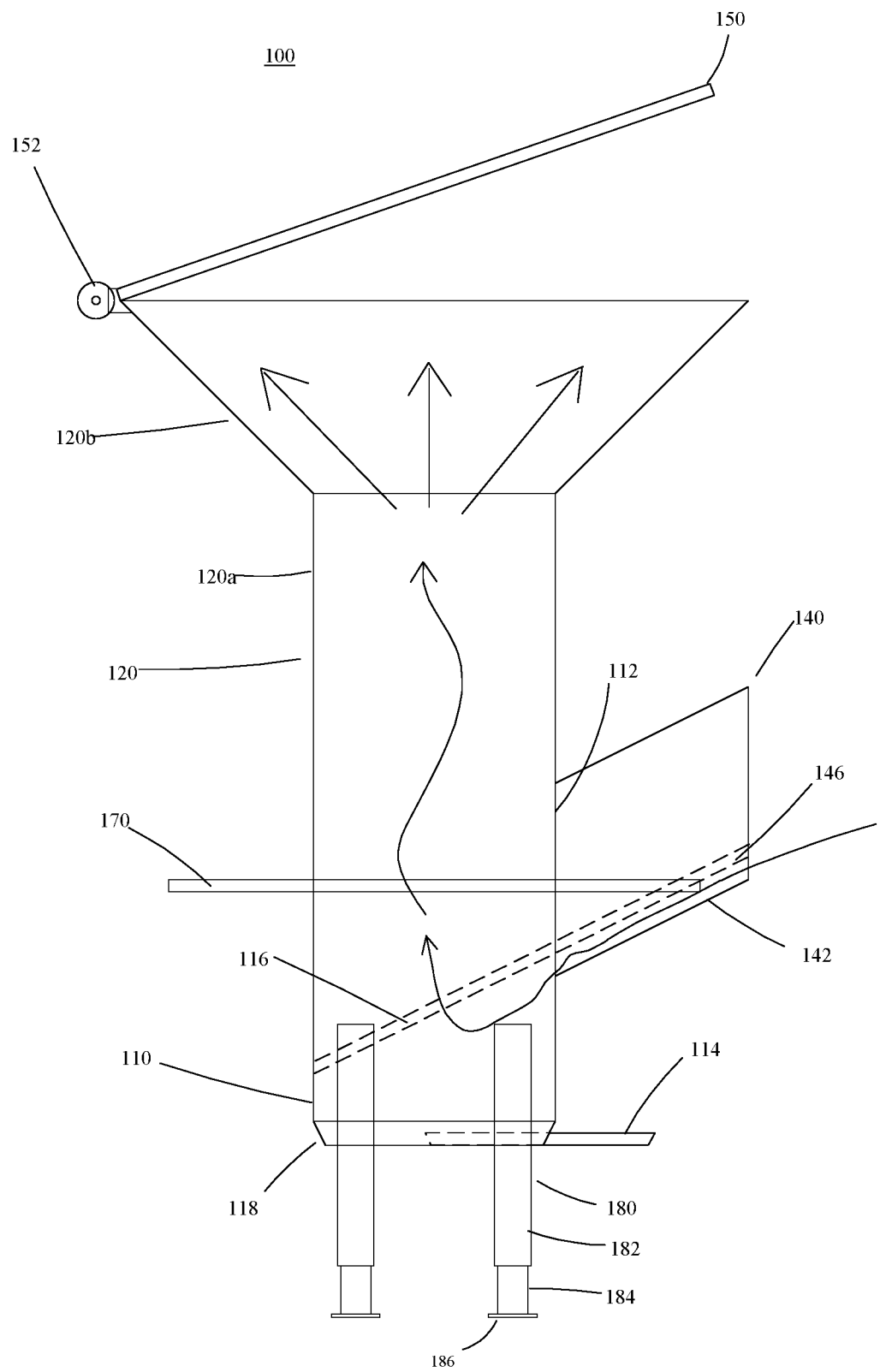
FIG. 2 is an exposed, side view of the stove of the present invention.
Figure 3:
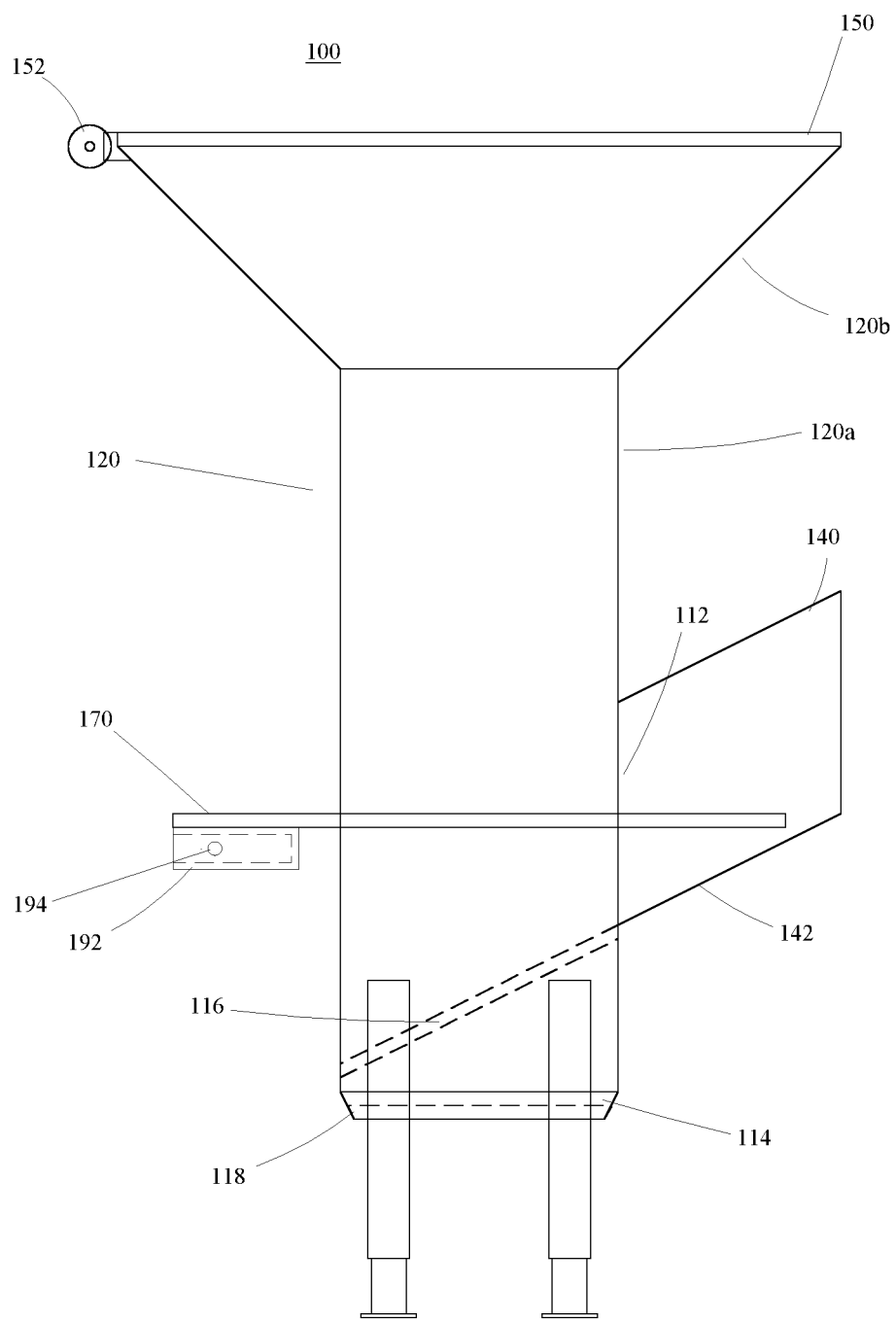
FIG. 3 is an exposed, side view of the stove of the present invention.

Referring first to FIGS. 1-3, a basic embodiment of the solid fuel stove 100 is shown. The solid fuel stove 100 includes a fuel bay 110 for the combustion of solid fuels. Solid fuels may include any combustible material, including wood, pellets, coal, coke, or other carbon-based material. The fuel bay 110 is enclosed excepting a lateral fuel aperture 112 and an opening that leads to the chimney 120. At the base of the fuel bay is the bay floor 114. The bay floor is a lower portion of the fuel bay into which fuel either fresh or spent, usually in ash form may descend. The preferred embodiment of the present invention further includes a fuel grate 116. The fuel grate is a platform upon which fresh fuel during its combustion phase is positioned. The preferred fuel grate includes apertures through which spent fuel, ashes or small fuel fragments, may pass to the bay floor.

Fuel is provided through the fuel aperture, which upon entry into the fuel bay utilizes gravity to descend to the bay floor 114 or fuel grate. The preferred embodiment of the present invention utilizes a fuel chute 140 for the application of fuel to the stove 100. The preferred fuel chute includes a chute floor 142, chute sidewalls 144, and a chute shelf 146. In a basic embodiment, as shown in FIG. 3, the chute floor 142 forms the platform upon which fuel is placed for the application of fuel through the fuel aperture into the fuel bay. The fire capable of being generated in a solid fuel stove can be significant; and as a matter of safety, there should be a barrier between the user and the hottest parts of the stove. The fuel chute serves as this barrier, yet does so in a way that permits the simple application of fuel into the fuel bay. A chute door may further be provided to the fuel chute to enhance the safety of the stove. In the preferred embodiment of FIG. 2, the chute shelf 146 serves as the platform upon which fresh fuel is placed for the addition of fuel to the stove. The use of an additional platform, i.e., the chute shelf 146, enhances the performance of the stove.

The present invention burns efficiently relative to comparable solid fuel stoves through its use of enhanced airflow. The fuel chute includes an aperture for fuel and air. As fuel is provided into the fuel bay and onto the fuel grate, the combustion of the stove is increased. As the combustion rate is increased, the need for oxygen is increased. An aperture dedicated to the supply of oxygen adjacent to the fuel bay permits the present invention to operate at high temperatures and efficiency, and furthermore, positioning the supply of oxygen beneath the combustion permits oxygen ingress access without battling with the rising gases from combustion. The preferred embodiment includes a unique component arrangement to facilitate these goals. The fuel chute includes the chute shelf positioned above the chute floor, with both abutted by chute sidewalls. The fuel chute may further include a chute ceiling, but such is not necessary. The only component, for purposes of safety, that needs significant length is the platform upon which combustible fuel is to be placed for application into the fuel bay. The lengths of the sidewalls, floor, or ceiling are significant to the extent of improving the safety of the present invention. As the length of these surfaces increase, protection for the user against burning and protection for the environment for drifting cinders is increased. The chute floor need not possess significant length, and in certain embodiments may be removed entirely to expose the fuel aperture 112 directly to the environment under the chute shelf. Oxygen enters between the chute floor 142 and the chute shelf 146 to enter the fuel aperture where it ascends upward to the fuel grate 116, which has apertures for the ascension of gas and the descent of ashes and burnt material. Upon combustion, combustion exhaust gases rise upward through the chimney 120.

The fuel grate 116 of the present invention is constructed of thick apertured stainless steel or other suitable material. By grate it is meant that the component is solid but possesses apertures sized to permit burnt materials to fall to bay floor 114 when they reach dimensions by which the combustible material portions are likely consumed to a degree to which the material lacks a substantial amount of combustible carbon. Preferred apertures include a width of approximately 25 mm. Any sizing and dimensions of the apertures within the grate fulfilling the objects of the present invention may be utilized. The fuel grate 116 may also be affixed into the fuel bay 110 at an angle such that the grate descends from the fuel aperture 112. It is more preferred that the fuel grate be affixed at an angle planar to that the chute shelf 146, if present, (FIG. 2) and the chute floor 142, if the chute shelf 146 is omitted (FIG. 3). The ideal embodiment of the fuel bay permits solid fuel to be gravity-fed into the fuel bay, and if an ash grate is utilized in an embodiment, having an ash grate that does not impede the travel of gradually descending fuel is a feature of the present invention. By angled, it means any orientation by which the grate is not coplanar with the object, e.g. the ground, upon which the stove 100 is set. By coplanar, it is meant that the grate 116 and chute surface leading to the grate share an angle and each component abuts the other—or one or more intermediary components at the same angle. By substantially coplanar, it is meant that the grate and chute surface leading to the grate are positioned at respective angles whereby the angle of deviation between the grate and chute surface from 180 degrees is equal to, or greater than, one half of the descent angle of the grate surface. For example, a descent angle of 40 degrees of the chute surface, e.g. a chute shelf, abuts the grate and the grate is oriented at an angle of +/−20 degrees. This is substantially co-planar for purposes of the present invention. The angles are contemplated relative to the surface upon which the stove sits, which for purposes of the present disclosure shall be assumed to be a planar ground surface.

Spent fuel and portions thereof falls through the grate apertures into the fuel bay floor 114. The preferred fuel bay floor 114 is a solid feature that resembles a tray in configuration that is slid into a lower portion of the fuel bay via slide rails 118. A left slide rail 118*a* and right slide rail 118*b* may be crafted into the lower portion of the fuel bay such that a mating fuel bay floor 114 can be constructed to matingly slide in a close-fit relationship into the fuel bay for the relatively sealed joining of the removable bay floor 114 into the fuel bay. The preferred fuel bay includes a lower portion that may permit selective exposure to the environment to permit the gravity based removal of ash. The commercial embodiment, which features the previously-discussed slide rails, permits a tray-like floor to be moved into the base of the fuel bay such that the side of the floor forms a continuous surface with the exterior of the fuel bay. Furthermore, the fuel bay floor may be positioned under the slide rails, such as on a support positioned on the legs or simply placed on the ground surface, to collect ashes as they fall to the floor. Because the absence of the floor of the fuel bay presents a gaping aperture underneath the point of combustion, there is an additional avenue for oxygen to be provided to the stove. Other embodiments of the stove that permit access to the lower portions of the fuel bay include hinged door versions of a bay floor, a circular floor portion rotatable about a point, and sliding doors. For purposes of discussion, the bay floor is a portion of the fuel bay upon which gravity would pull a spent piece of fuel, which may include flat, angled, or even in some cases substantially vertical surfaces.

Combusted gases rise from the fuel bay 110 into the chimney 120. The preferred chimney of the present invention includes two portions; a substantially rectangular portion 120*a* and truncated pyramidal portion 120*b*. Because the present invention is intended to be a cooking appliance, a cooking shelf 150 is positioned above the fuel bay and chimney. The chimney 120 is the portion of the present invention by which heated gases travel along a sealed path to contact food placed upon the cooking shelf 150. The present invention omits piping and other means of conducting gas in a direction other than the natural inclination of heated gas to rise. Instead, the chimney acts as the sole conduit between the fuel bay and the cooking shelf, and includes a width comparable, and preferably no less than that of the fuel bay. It is preferred that at some point, the chimney increase in girth such that the sidewall of the chimney forms an angle. The angling of the chimney directs the heated gas to a wider cross-section of a cooking surface. Furthermore, the use of an angled surface permits food likely to "drip" to be positioned other than directly above an open flame—if so desired. Furthermore, the angling permits a large portion of the chimney to be cleaned from above by removing the cooking shelf 150 from the chimney 120. To the extent that a user desires to clean a substantially vertical portion of the chimney, the tapered chimney upper portion 120*b* permits a good portion of the human body to be positioned into the chimney to allow an arm to reach most portions of the stove. In commercial embodiments, it is preferred that the distance from the lowest portion of the open fuel bay and the highest portion of the chimney be no greater than the arm's length of the average man to permit the entirety of the stove to be cleaned by a single person without use of an elongated cleaning implement. The sidewall of the chimney is preferably constructed of heavy wall steel tubing.

The cooking shelf 150 of the present invention is preferably affixed to the chimney 120 via an external hinge 152. An external hinge is preferred because upon removal of the cooking shelf from the chimney permits the entire surface of the shelf 150 and the top portion of the chimney to be exposed for cleaning. The cooking shelf may utilize the construction of a conventional grill grates, or such other configuration as will achieve the purposes of the present invention—including a solid griddle top.

Circumscribing portions of the stove 100 is a solid steel peripheral plate 170 dubbed the "potato plate." The peripheral plate is meant to be a cooking portion for slow-cooking, low-temperature food items. The peripheral plate is not directly exposed to flame; however, the peripheral plate is affixed to the stove 100, either at the chimney or fuel bay (or because there is not a clear point of differentiation between the two components, approximately the point where one turns into the other). The stove generates enough heat such that the use of a thermally-conductive material, e.g. steel, transmits enough heat from the vertical surface of the chimney to the horizontally-mounted peripheral plate 170 to cook food items not requiring substantial heat, e.g. potatoes and corn. The preferred peripheral plate includes apertures 172 cut into it for carrying the stove. This plate provides a steady, radiant heat.

Figure 4:
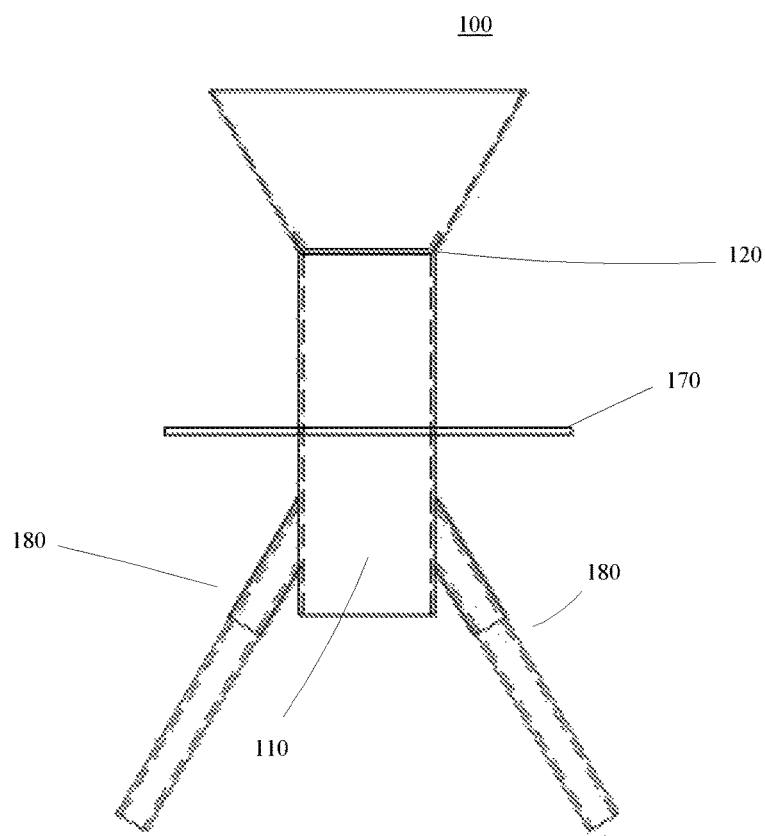
FIG. 4 is an exposed, rear view of the stove of the present invention.
Figure 5:
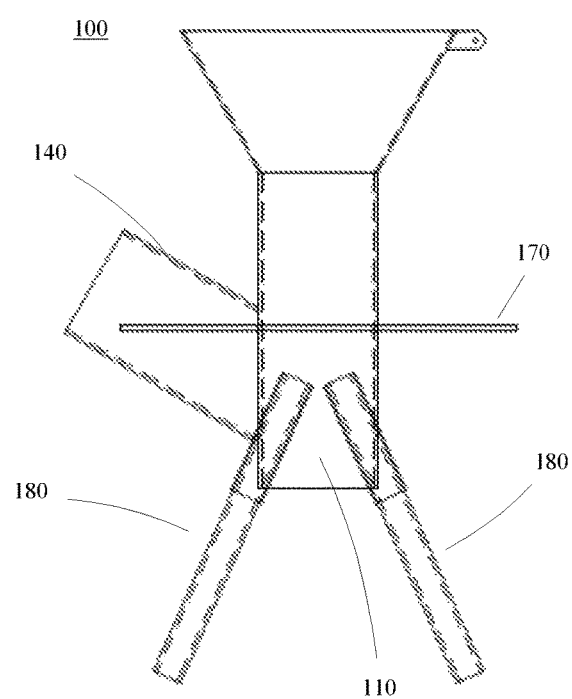
FIG. 5 is an exposed, side view of the stove of the present invention.

Turning now to FIGS. 4-5, in addition to FIGS. 1-3, legs 180 are utilized to permit the stove to be positioned a substantial distance from a ground surface. The legs 180 of the stove 100 may be adjustable to allow it to be leveled on uneven terrain. The legs may comprise two portions, a leg sleeve 182 and a leg extension 184. The leg extensions 184 fit within the leg sleeve 182 to recede and protrude to the extent as may be necessary to position the cooking shelf 150 in a substantially-level orientation. The preferred legs are not positioned at any point directly beneath the fuel bay floor 114 to permit a component sized approximately equal to the base of the fuel bay to accept descending spent fuel and/or to permit removal and actuation of lower portion of the fuel bay to empty spent fuel. The preferred construction includes legs that are affixed to the side of the fuel bay, rather than underneath, and utilizes legs that flare outward from the longitudinal center of the stove 100.

The use of steel in the stove provides the durability and longevity plus withstands the heat that the stove puts out. No other readily available substance can provide all of those at once. It is painted with a high-heat paint that can withstand up to 1000 degrees of temperature. The use of stainless steel for some components allows for even higher resistance to wear and heat damage and increases the longevity of the most important parts of the stove, the cooking grate and the ash grate.

Figure 6:
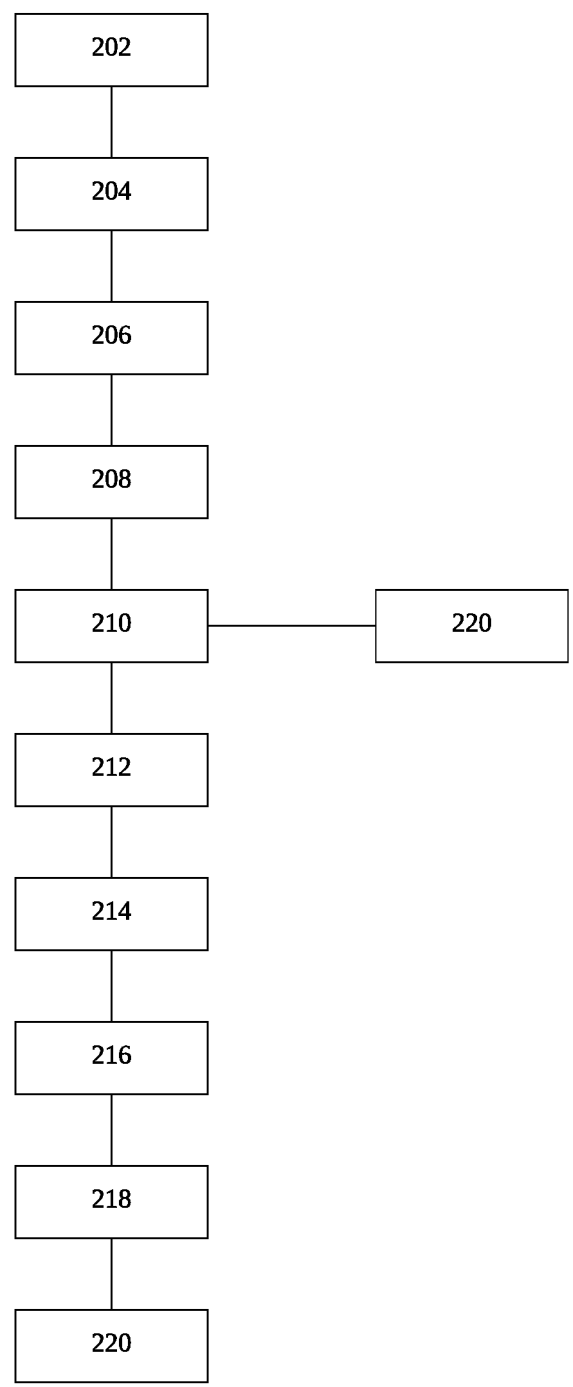
FIG. 6 is a view of the process of the present invention.

Returning to FIG. 2, and with reference to FIG. 6, the present invention further includes a tow-capable embodiment of the stove 100 providing a unique stove transportation process 200. Because the present invention may be constructed of relatively rugged materials, the tow-capable embodiment may affix a tow hitch 192 to the body of the stove 100 that permits the body to be transported utilizing a self-propelled vehicle, including automobiles, tractors, all-terrain vehicles and the like. If the present invention utilizes welding, the preferred affixation point of a hitch is the plate 170, although any self-supporting component of the stove may be utilized. A female hitch adapter may be affixed to the underside of the plate 170 for releasable attachment 202 to a vehicle utilizing the hitch lock 194 provided therein. As preferred versions of the present invention utilize adjustable legs, the stove may be positioned in an attachment position where the legs position 204 the body of the stove relatively high. Then a vehicle may couple 206 with the stove, at which point the legs may be adjusted 208 to recede towards the body of the stove and away from the ground. The stove may then be locked 210 to the vehicle and transported 212 to another location. The stove may then be returned to a ready-to-use state where the legs are re-positioned 214 to be lower to, or contact, the ground, the stove is de-coupled 216 from the automobile, and the vehicle moves to release 218 the stove 100. The rugged construction of the stove may also permit the stove to be used 220 while affixed to the vehicle, particularly in embodiments, whereby the trailer hitch is affixed to a component of the stove designed to either dissipate heat or receive less heat. In essence, the use of the stove of FIG. 2, the plate 170 acts as a heat sink fin that ensures that the plate receives less heat than, say, the fuel bay of the stove. The trailer hitch 192 of the present invention may include any known device for coupling an unpowered entity to a self-propelling vehicle, including a ball mounts, "goose necks," etc.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A solid fuel stove comprising:
   a stove body comprising body sidewalls defining (i) a fuel bay having a bay floor and a lateral fuel aperture positioned above said bay floor within a feed sidewall, and (ii) a substantially-vertical chimney, vertically positioned above said fuel bay, oriented to directly accept heat therefrom, comprising an outwardly flaring sidewalls terminating in an upper end heat outlet with a perimeter greater than a perimeter of said fuel bay;
   a fuel chute descending into said fuel aperture, comprising a chute floor and chute sidewalls, at least partially circumscribing said fuel aperture, said chute floor forming an acute angle with said fuel aperture for the gravity-fed addition of fuel into said fuel bay;
   a perforated fuel grate extending from said chute floor downwardly within said fuel bay, forming relative to said rear body sidewall, opposite said feed sidewall, beneath said chute floor an obtuse angle, and whereby said fuel grate and said chute floor form a substantially continuous surface positioning said fuel grate distally beneath said fuel chute floor adapted to facilitate a continued descent of fuel into said fuel bay as an effective gravitational extension of said fuel chute;
   a substantially flat cooking shelf, spanning said heat outlet, comprising a perforated surface releasably affixed to said chimney; and
   a stand, affixed to said fuel bay, having multiple legs diverging from said fuel bay.

2. The stove of claim 1 further comprising a substantially-planar peripheral plate affixed to said fuel bay, constructed of a thermally conductive material.

3. The stove of claim 1 wherein said bay floor is releasably affixed within said fuel bay for the selected removal of said bay floor from an interior of said fuel bay.

4. The stove of claim 1 wherein said legs include height-adjustable legs.

* * * * *